Nov. 16, 1937.　　　H. H. NISSLEY ET AL　　　2,099,134
VEHICLE BODY CONSTRUCTION
Filed Jan. 21, 1935　　　2 Sheets—Sheet 1

INVENTORS.
Harry H. Nissley,
Gabriel M. Mazzie.
BY
Harness, Lind, Pates & Harris
ATTORNEYS.

Nov. 16, 1937.　　H. H. NISSLEY ET AL　　2,099,134
VEHICLE BODY CONSTRUCTION
Filed Jan. 21, 1935　　2 Sheets-Sheet 2
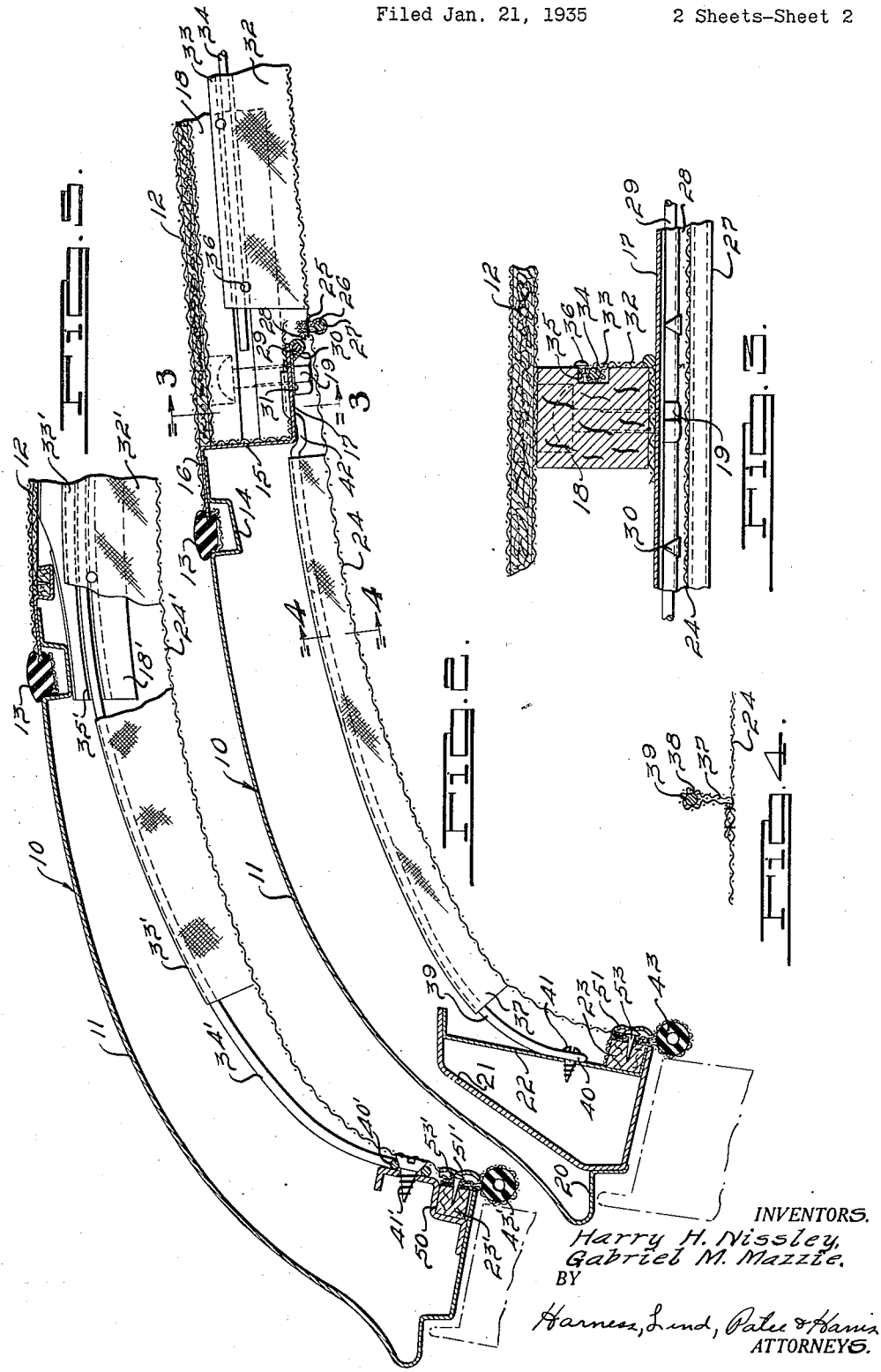
INVENTORS.
Harry H. Nissley,
Gabriel M. Mazzie.
BY
Harness, Lind, Palee & Harris
ATTORNEYS.

Patented Nov. 16, 1937

2,099,134

UNITED STATES PATENT OFFICE 2,099,134

VEHICLE BODY CONSTRUCTION

Harry H. Nissley, Highland Park, and Gabriel M. Mazzie, Detroit, Mich., assignors to Chrysler Corporation, Detroit, Mich., a corporation of Delaware Application January 21, 1935, Serial No. 2,654

3 Claims. (Cl. 296—137)

This invention relates to improved vehicle body construction.

More particularly, the invention pertains to improved vehicle head lining and interior trim mounting structure.

One of the main objects of the invention is to provide improved mounting and attaching means for the interior head lining and trim of a vehicle body.

Another object of the invention is to provide detachable head lining supporting means of this character which can be conveniently installed, removed and replaced by unskilled workmen.

A still further object of our invention is to provide an improved head lining which has a neatly tailored appearance and which is held by its mounting or attaching elements in a smoothly drawn shape of a selected contour without the aid of wire backing or reinforcing netting.

Other objects of the invention are to provide mounting means for interior head lining material which yieldably supports the lining in suspended relation; to provide mounting means of this character which can be mainly assembled with the head lining material before delivery to a vehicle assembly line and then installed in a vehicle within a relatively short period of time; and to provide head lining mounting structure which is inherently constructed to impart a uniform finished contour to the interior top portion of vehicle bodies.

The above being among the objects of the present invention, the same consists in certain novel features of construction and combination of parts to be hereinafter described with reference to the accompanying drawings and then claimed, having the above and other objects in view.

Illustrative embodiments of the invention are shown in the accompanying drawings, in which:

Fig. 2 is a fragmentary, vertical sectional view taken on the line 2—2 of Fig. 1.

Fig. 3 is a fragmentary, longitudinal sectional view taken on the line 3—3 of Fig. 2.

Fig. 4 is a fragmentary, vertical sectional view taken on the line 4—4 of Fig. 2.

Fig. 5 is a fragmentary, transverse sectional view of the roof of a vehicle passenger compartment, similar to Fig. 2, but disclosing a further development of the invention.

Figure 1:
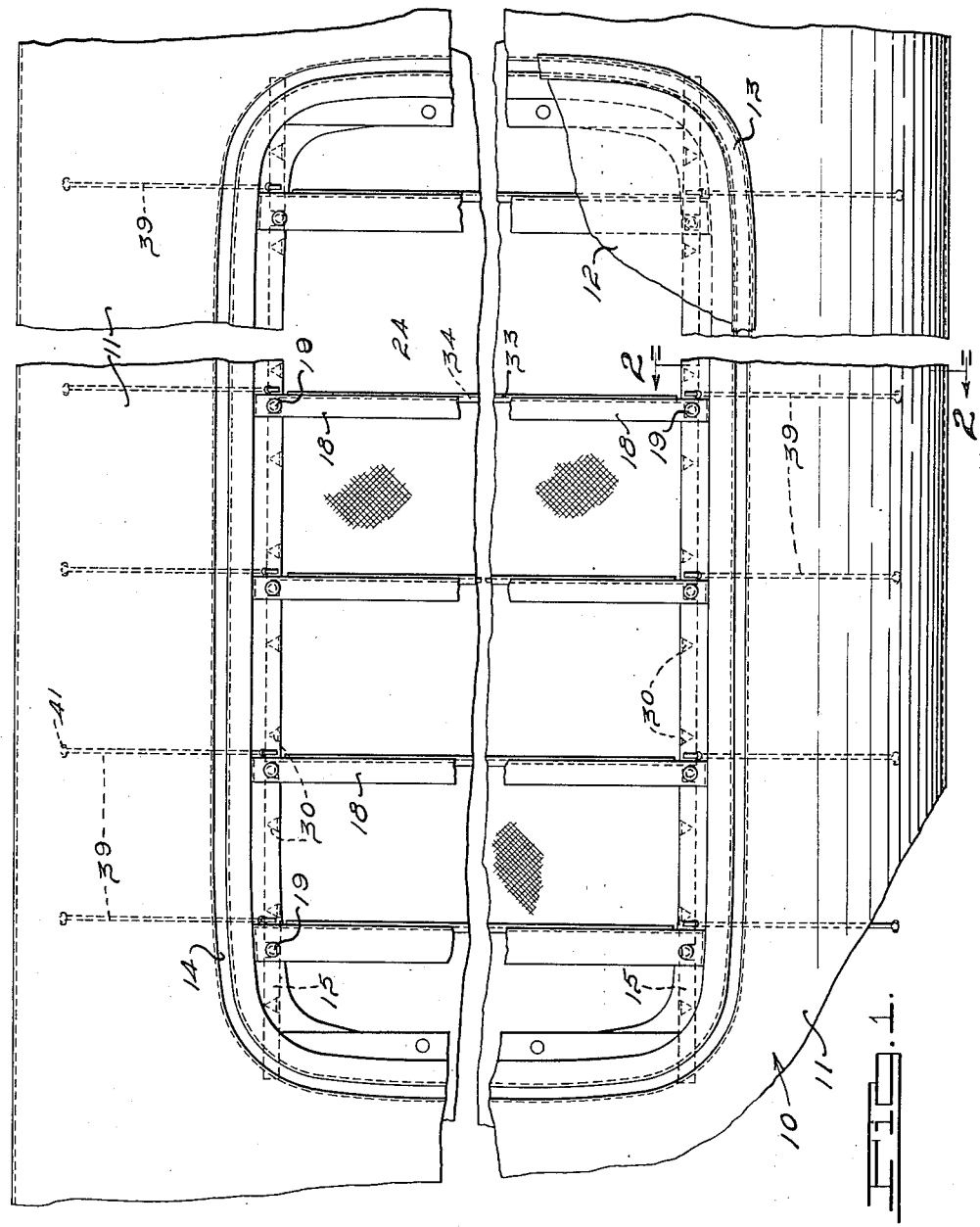
Fig. 1 is a fragmentary top plan view of the passenger compartment of a vehicle embodying the improved interior trim mounting structure, portions of the external decking of the passenger compartment roof being broken away to disclose the underlying structure.

In the form of the invention illustrated in Figs. 1 to 4, inclusive, the improved head lining and mounting therefor is illustrated in conjunction with a vehicle passenger compartment roof structure, generally designated by the numeral 10, which includes an exterior wall having arcuate shaped sheet metal marginal portions 11 and a substantially flat or central panel portion 12 which preferably comprises flexible decking material.

The decking material 12 overlaps the adjacent edge portions of the arcuate marginal portions 11 and is detachably fixed to the latter by securing means which preferably comprises a rubber retaining strip 13 engaged in a suitable channel 14 formed in the sheet marginal portions 11. The channel 14 and the securing strip 13 preferably extend completely around the central substantially flat part of the roof and retain the decking material 12 in a relatively tightly stretched condition. Provided in the roof structure 10 are longitudinally extending angle bars 15 which are located adjacent the longitudinal edges of the central portion of the roof at the junction of the latter with the arcuately curved marginal portions thereof. The angle bar 15 includes an upper substantially horizontal flange 16 which is arranged in superimposed relation upon the inner edge portion of the arcuate marginal part 11 of the roof structure and which extends beyond the adjacent side of the channel 14 thereof, so as to cooperate with the securing strip 13. The angle bar 15 is also provided with an oppositely projecting, substantially horizontal lower flange 17 which extends inwardly of the space between the adjacent edges of opposite side marginal portion 11 of the roof structure.

Mounted on the angle bars 15 of respectively opposite sides of the roof structure are transversely extending, longitudinally spaced ribs 18, preferably comprising wood, which are secured at their opposite longitudinal extremities of the lower horizontal flanges 17 of the angle bars 15 by bolts 19.

The outer edges 20 of the arcuate sheet metal marginal portions of the roof structure are each secured to a longitudinally extending channel-shaped roof beam 21, respectively, having an open inner side provided with a mounting plate 22. Each channel member 21 and mounting plate 22 carry a tacking strip 23, preferably comprising wood, which is located at the interior of the roof structure adjacent the lower extremity of each arched marginal portion thereof.

The head lining 24 which, for the purpose of illustration, is shown to comprise cloth, is disposed in the interior of the passenger compartment of the vehicle and located in spaced relation to the exterior part of the roof structure thereof. The lining material 24 may comprise one integral piece of any suitable sheet-like material cut substantially to the dimensions of the roof structure, or it may be formed of a plurality of sections of such material, attached or otherwise suitably secured together. In the illustration shown in Figs. 1 to 4, inclusive, the head lining comprises 3 panels, one corresponding to each arched longitudinal marginal portion of the roof and one corresponding to the substantially flat central portion thereof. The adjacent longitudinal edges of the respective panels of the head lining 24 are secured together, as illustrated in Fig. 2, by stitches 25 which extend through the upwardly bent marginal portions of the adjacent lining panels. Each seam between the adjacent lining panels is concealed from view by a bead 26 which includes a central filler and an outer wrapping 27, preferably comprising fabric. The outer wrapping 27 of the bead 26 is drawn firmly around the central core or filler thereof and the edge portions of the wrapping are disposed in adjacent relationship and preferably interposed between the upwardly turned edge portions of the adjacent panels of lining material to which they are secured by the stitches 25.

The stitches 25 also serve to secure to the lining material 24, at the junction of the panels thereof, a tensioning strip 28, having a loop formed along its outer edge portion in which a relatively rigid wire 29 is disposed. The wire 29 is engageable by inwardly extending metal hooks 30 formed integral with a sheet metal securing strip 31 which extends longitudinally of the roof structure 10 and which is secured thereto by the bolts 19. A tensioning strip 28 is provided along each longitudinal edge of the central panel of the head lining material 24 and when the latter is installed, these strips serve to retain the central portion of the head lining in stretched condition.

The central portion of the head lining material 24 is supported in suspended relation from the transversely extending wood ribs 18 by lists 32 extending transversely of the central panel portion of the head lining material and fixed to the external side thereof by concealed stitches or other suitable means. The lists 32 are each arranged so as to lie in adjacent relationship to a corresponding vertical side of each of the transversely extending ribs 18 respectively, as illustrated in Fig. 3.

Provided along the outer edge portion of each list 32 is a loop 33 in which a relatively stiff wire member 34 is disposed. The wire 34 and looped portion of each list 32 is receivable in a channel 35 formed in a vertical side of its associated rib 18 as illustrated in Fig. 3. The upper edge portions and wires of the respective lists 32 are secured in the channels 35 of their respective associated cross ribs 18 by spaced tacks 36 which are arranged alternately above and below the wire 34 respectively.

Each outer marginal panel of the head lining material 24 is supported in suspended relation and in a curved contour corresponding substantially to the curvature of the arcuate marginal portions 11 of the roof structure by a plurality of longitudinally spaced, substantially transversely extending lists 37 which also preferably comprise strips of cloth. The list illustrated in Fig. 2 is of substantially uniform width throughout its length, but the width of the list may be varied at diverse longitudinal portions, if desired, in order to bring the curvature of the outer marginal panels of the lining material 24 to a desired contour. Formed along the outer or upper edge portion of each list 37, as viewed in Fig. 2, is a loop 38 in which a relatively rigid wire element 39 is disposed. The wire element 39 is located between the external portions of the roof structure and the head-lining thereof and is preferably bowed to correspond with the curvature of the arched marginal portions of the roof structure. Formed at the outer extremity of each wire member 39 is an eye 40 through which a screw 41 extends, the screw being anchored in the mounting plates 22 of the side channel 21 of the roof structure. The inner end portion of each bowed wire element 39 is provided with an offset section 42 which accommodates the engagement of the inner extremity of the wire member 39 in an aperture formed in the horizontal flange 17 of the angle bar 15, as illustrated in Fig. 2. The supporting wires 39 are thus detachably secured to the roof structure during assembly of the headlining material therein.

The foregoing head lining material and substantially all parts of its mounting structure, including the supporting lists 32 and 37 and wires 34 and 39, as well as the trim bead 26, tensioning strip 28 and the wire element 29 thereof, may be factory assembled and delivered to a vehicle assembly line in completed condition and ready for convenient installation in the interior of the vehicle passenger compartment at a proper stage in the assembly thereof.

In the installation of head lining embodying the invention, the central panel portion of the lining material is initially secured in place beneath the substantially flat central panel 12 of the roof structure by engaging the upper looped edges and wires 34 of the lists 32 in the corresponding channels 35 of the cross ribs 18. In practice, it is preferable to start from one or the other longitudinal extremities of the central portion of the roof structure and secure each upper edge portion of each successive list to its corresponding cross rib 18 by driving the tacks 36 in place as illustrated in Fig. 3. After all of the lists 32 of the central portion of the lining material are tacked in the foregoing manner, the central panel portion of the lining material is then stretched transversely and held in such stretched condition by engaging the hooks 30 around the wires 29 of the stretching strips 28.

The marginal portions of the lining material 24 are then brought to their proper relationship with respect to the arched marginal portion of the roof structure by engaging the inner extremity of the wire elements 39 of the lists 37 in suitable apertures formed in the horizontal flange 17 of the angle bars 15, while the wire elements 39 are in a substantially vertical position. The wire elements 39 are each extended upwardly through their respective apertures in the horizontal flange 17 until the offset portion 42 of each wire element comes into engagement with the flange 17. The offset portion 42 permits outward rotation of the wire elements of respectively opposite sides of the top structure from their vertical inserting position to the position illustrated in Fig. 2, in which the wire elements 39 are anchored by threading the screws 41 into the mounting plates 22 of the beam structure 21 of opposite sides of the roof. If the lining material is provided with front and rear marginal panel portions, the latter as well as the side edge portions thereof may be secured in place in the manner illustrated at the left in Fig. 2 by securing the edge portions of the lining material to the tacking strip 23 with tacks 53 which also serve to secure a bead 43 to the tacking strip. The bead 43 has a central core and outer wrapping provided with an extension which is preferably disposed in superimposed relation on the edge portions of the lining material and covered by a garnish molding 51. The bead 43 is preferably provided along the longitudinal edges of the lining material as illustrated in Fig. 2 as well as along the front and rear lateral edges of the lining material (not shown).

In the form of the invention illustrated in Fig. 5 the external portion of the roof structure is substantially identical to that shown in Fig. 2, and corresponding parts thereof are designated by the same numeral.

The central substantially flat decking panel 12 of the exterior of the roof is secured to the arched sheet metal marginal portions 11 thereof by a securing strip 13, preferably comprising rubber, which extends completely around the central portion of the roof structure. Securely mounted on the roof structure 10 but beneath the central portion thereof are transversely extending, longitudinally spaced cross bows 18' which are preferably slightly longer than the width of the central portion of the roof and which extend beyond the lateral extremities thereof as illustrated in Fig. 5. Formed in corresponding vertical sides of the ribs 18' are channels 35' which extend longitudinally of the ribs from one end to the other end thereof. The cross ribs 18' may be secured to the roof structure in the manner illustrated in Fig. 2, or in any other suitable way.

The head lining embodied in this form of the invention preferably includes an integral sheet-like piece of lining material 24', preferably comprising fabric and having strips of flexible material or lists 32' secured to its outer side. The lists 32' extend transversely of the lining 24' and they are spaced longitudinally thereof so that each registers with one vertical grooved side of one of the cross ribs 18', respectively. In the form shown, the lists 32' are arched at their end portions so as to assist in retaining the lining material 24' in an arched contour corresponding to the contour of the arched marginal portion 11 of the exterior part of the roof structure.

The outer edge portion of each list 32' is provided with a loop 33' through which a substantially rigid wire element 34' extends. The end portions of the wire element 34' are bowed to correspond to the arched curvature of the sheet metal marginal portions of the exterior of the roof 10 and at the extremities of the wire members 34' are formed eyes 40' through which screws 41' extend. The screws 41' are threaded in apertures formed in a metal anchoring strip 50 which is secured to the interior portion of the longitudinal sides of the roof structure, as illustrated at the left in Fig. 5. The side and end edge portions of the lining material 24' are fixed to a tacking strip 23' by tacks 53' and concealed by garnish molding strips 51'. A trim bead 43' is also fixed to the molding strip 23' by the tacks 53' which anchor the edge portions of the lining material 24' thereto.

The head lining illustrated in the form of the invention shown in Fig. 5 may be assembled prior to delivery to a vehicle assembly line and installed in the vehicle during assembly thereof in substantially the same manner described in the discussion of the form of the invention shown in Figs. 1 to 4, inclusive.

In this case, however, the suspension lists 32' and the wire elements 34' extend substantially completely across the width of the lining structure and they are preferably completely mounted in place by tacking the intermediate portions of the wire element to the ribs 18' after such portions have been disposed in the grooves 35' thereof and immediately thereafter the extremities of each wire element 34' are anchored to the side structure of the roof. If desired, all the intermediate portions of the lists 32' may be secured to their respective cross ribs 18' and thereafter the extremities of the wire element 33' may be secured to the side portions of the roof structure. In either case uniformity in the trim and tailored appearance of the interior of the vehicle passenger compartments can be obtained rapidly by relatively unskilled workmen.

Although but two specific embodiments of this invention are herein shown and described, it will be understood that various changes including the size, shape, and arrangement of parts may be made without departing from the spirit of our invention, and it is not intended to limit its scope other than by the terms of the appended claims.

We claim:

1. In a vehicle comprising a roof structure having transversely arched side marginal portions and having a relatively flatter central portion, a substantially assembled head lining portion and mounting structure therefor including a piece of sheet lining material, transversely extending lists spaced longitudinally of said lining material having edge portions fixed to the exterior side thereof, portions of lists having arched edge portions, means for securing said lists to said roof structure including wire elements, each fixed to the outer edge portion of one of said lists respectively, the wire elements of the portions of said lists which register with the arched portions of said roof structure being bowed to correspond with the curvature thereof, substantially rigid members fixed to said lining material and extending along the longitudinal edges of the flat portion of said roof structure and secured thereto, and means for tensioning said lining material between said members comprising a flexible strip initially assembled with said lining material.

2. In a vehicle comprising a roof structure having arch shaped side marginal portions and a relatively flat central portion, transversely extending longitudinally spaced ribs secured to said roof structure having a length substantially equal to the transverse dimension of said central portion, an assembled head lining and mounting structure therefor including panels for a respective portion of said roof structure conforming to the general contour thereof, transversely extending longitudinally spaced lists having an edge portion fixed to the exterior side of said lining, wire elements fixed to the other edge of said lists respectively for supporting said lining panels in suspended relation at a predetermined location spaced from the external side of said roof structure, said elements being fixed to respective transverse ribs, and means securing the adjacent edge portions of said lining panels in suspended relation from said roof structure, said means including a substantially rigid member and a fabric tensioning element spaced from said roof structure.

3. In a vehicle comprising a roof structure having arch shaped side marginal portions and a relatively flat central portion; longitudinally extending side members adjacent the edges of said central portion at the junction of the latter with said arched marginal portion; transversely extending, longitudinally spaced ribs having the longitudinal extremities thereof secured to a respective side member; a head lining material including panels for a respective portion of said roof structure conforming to the contour of the adjacent portions of said structure; means securing a panel of said lining material to a respective portion of said roof structure including transversely extending lists spaced longitudinally of said material and having edge portions fixed to the exterior side thereof; a plurality of wire elements each fixed to the outer edge portion of one of said lists and conforming to the contour of the adjacent portion of said roof structure for supporting said panels, the elements supporting said panels adjacent said arched marginal portions each having an extremity fixed to a respective longitudinal side member and the other extremity thereof fixed to the outer longitudinal side of said roof structure and the elements supporting said panel adjacent said central portion being secured to and supported by said transversely extending ribs respectively; and means for supporting the adjacent edge portions of said lining panels including a longitudinally extending tensioning strip adjacent an edge of said central panel and in suspended relation from said roof structure.

HARRY H. NISSLEY.
GABRIEL M. MAZZIE.